(12) United States Patent
Weh et al.

(10) Patent No.: US 6,616,196 B1
(45) Date of Patent: Sep. 9, 2003

(54) COUPLING HAVING MEANS WHICH PREVENT SEPARATION

(76) Inventors: Erwin Weh, Siemensstrasse 5, D-89257 Illertissen (DE); Wolfgang Weh, Siemensstrasse 5, D-89257 Illertissen (DE)

( * ) Notice: Subject to any disclaimer, the term of this patent is extended or adjusted under 35 U.S.C. 154(b) by 0 days.

(21) Appl. No.: 09/700,515
(22) PCT Filed: May 14, 1999
(86) PCT No.: PCT/EP99/03326
§ 371 (c)(1),
(2), (4) Date: Jun. 22, 2001
(87) PCT Pub. No.: WO99/58893
PCT Pub. Date: Nov. 18, 1999

(30) Foreign Application Priority Data

May 14, 1998 (DE) ..................... 298 08 654 U

(51) Int. Cl.[7] ................................. F16L 21/06
(52) U.S. Cl. ................ 285/322; 285/124.1; 137/614.01
(58) Field of Search ................. 285/318, 322, 285/316, 124.1; 137/614.01–614.06

(56) References Cited

U.S. PATENT DOCUMENTS

| | | | | |
|---|---|---|---|---|
| 2,453,741 A | * | 11/1948 | Opp ....................... | 137/614.04 |
| 3,454,047 A | | 7/1969 | Johnston | |
| 3,986,732 A | * | 10/1976 | Stanley ....................... | 141/285 |
| 4,485,845 A | * | 12/1984 | Brady ..................... | 137/614.04 |
| 5,209,528 A | * | 5/1993 | Weh et al. .................... | 285/316 |
| 5,454,602 A | * | 10/1995 | Anderson et al. ........... | 285/315 |
| 5,564,471 A | | 10/1996 | Wilder et al. | |
| 5,740,835 A | * | 4/1998 | Murphy .................. | 137/614.05 |
| 6,343,630 B1 | * | 2/2002 | Dubinsky .................... | 141/385 |

FOREIGN PATENT DOCUMENTS

| | | |
|---|---|---|
| EP | 0 340 879 | 11/1989 |
| FR | 2 601 518 | 1/1988 |
| WO | WO 93/20378 | 3/1993 |

* cited by examiner

*Primary Examiner*—Lynne H. Browne
*Assistant Examiner*—Aaron M Dunwoody
(74) *Attorney, Agent, or Firm*—Knobbe, Martens, Olson & Bear, LLP

(57) ABSTRACT

A coupling having means which inhibit separation which is provided for transferring fluid, especially for refueling vehicles. The coupling includes a tubular housing, at least one locking element, in particular, a plurality of expandable collects having an engagement profile for connecting to a correspondingly constructed connection nipple. The coupling also includes a piston, which can be displaced relative to the housing and which can be fixed, especially for being placed on the connection nipple. The piston is subject to the action of a spring opposite of the direction of connection in order to adjust the separation prevention force in relation to the housing of the coupling and is mounted such that it can be displaced opposite of the direction of connection in relation to the locked piston in order to release the engagement of the locking element.

6 Claims, 1 Drawing Sheet

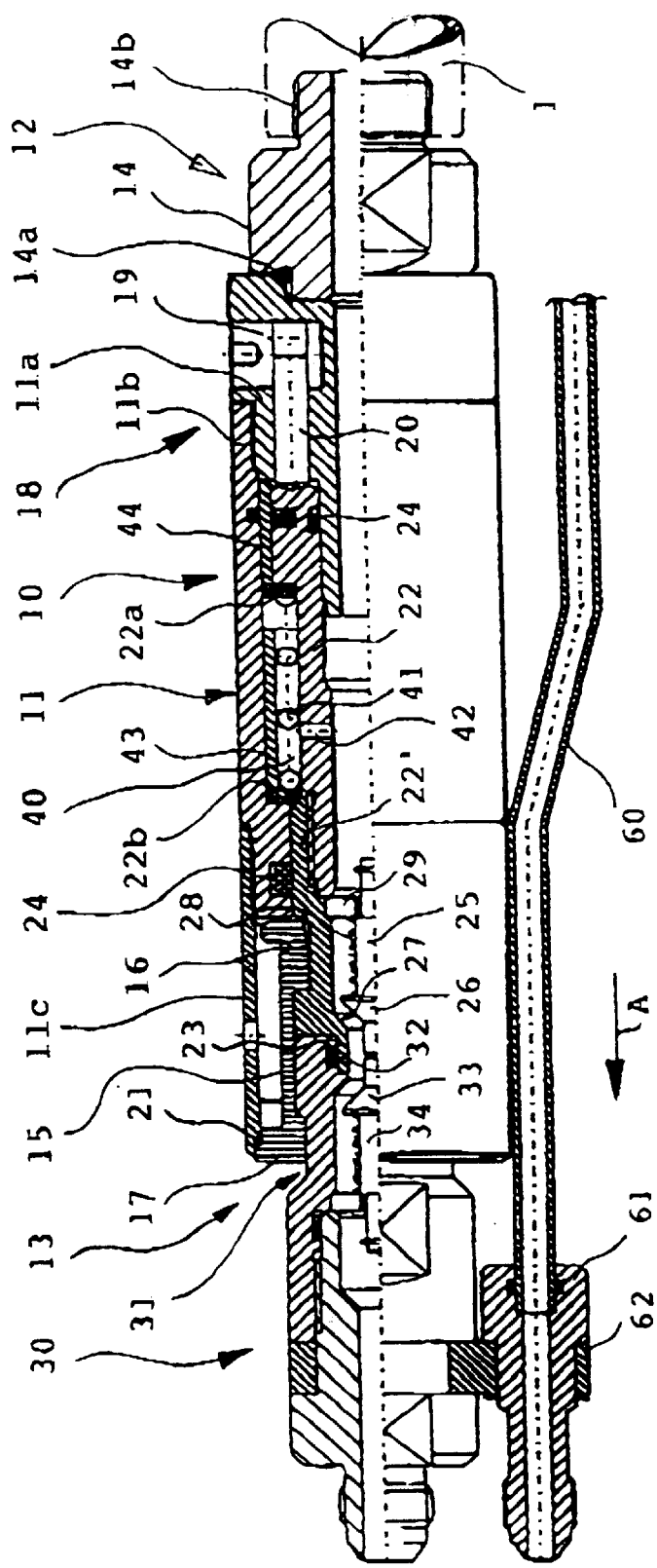
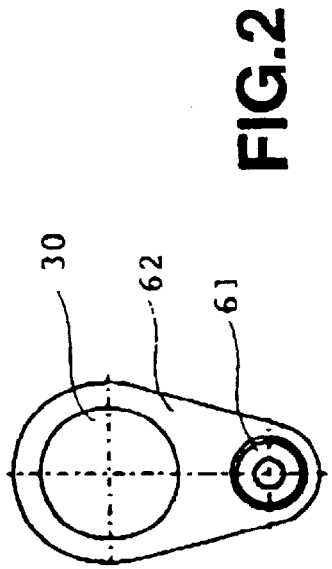
FIG.1
FIG.2

COUPLING HAVING MEANS WHICH PREVENT SEPARATION

BACKGROUND OF THE INVENTION

This invention relates to a coupling for transport of gaseous and/or liquid fluids, especially for filling motor vehicles.

Especially with such couplings a secure plug-in connection which can be made rapidly should be provided, for the transport of a fluid from a pressure source, for example from a filling station. Safe operation of the connector coupling is important, so that problem-free handling is facilitated, even at high pressures.

Such a connector coupling is described in EP-A 0 340 879 of the applicants, where the connector coupling has a housing with a fluid inlet and a fluid outlet, as well as a plurality of valves, in order to ensure reliable sealing of the coupling until the connection is fully made. These valves are actuated in a specific predetermined sequence after fitting the connector coupling, where the outlet valve is first opened by pushing the connector coupling on to a connector nipple, the collet jaws are then closed by further movement of an eccentric control lever and finally the inlet valve is opened. The control lever engages through an eccentric shaft with the slider sleeve for locking the collet jaws and with a central sealing piston, which opens up the fluid inlet after completion of the connection of the plug-in coupling. A secure connector facility is thus provided, since the collet jaws of this coupling are positively locked in the connection position.

A similar quick connector is further known frm WO-A 93/20378 of the applicants, wherein collet jaws with an engagement profile are provided in the region of the outlet as the preferred locking elements. A hollow sealing piston which can slide in the coupling housing is also described here and is coupled to an actuating device connected to a sliding sleeve for closing and opening the collet jaws. Operation of the actuating device in the form of an eccentric lever is also necessary here for reasons of safety, in order to be able to release the locking of the quick connector.

Such connector coupling have proved themselves in refuelling gas vehicles, on account of their high security. Because of the increasing spread of gas vehicles however, filling up is carried out not only by qualified filling station personnel by also by the driver himself. Accidents have been reported in which the driver has forgotten to release the connector coupling and has thus driven away from the filling station with the gas line attached. The gas line, mostly under pressure, is torn out of its anchorage, so that significant damage, to the vehicle also can result. In addition, substantial amounts of fluid can escape, in spite of suitable safety valves.

SUMMARY OF THE INVENTION

Accordingly the present invention is based on the object of providing a coupling with a safety breaking device, so that in such events, danger and damage are avoided.

The proposed coupling is distinguished by particularly high security, since defined separation of the lines or the connector is achieved, even with high connection pressures, so that exposure danger and damage can be prevented. In particular, in the case of the preferred embodiment for re-fuelling motor vehicles, the possibility of the gas or liquid escaping is safely avoided by the proposed safety breaking device on breaking or release of the connector coupling. This is especially important to protect against accidents but also to protect the environment, since even with break couplings at the "petrol pump" a substantial volume of gas can be lost, which is present in the hose between the filling station and the connector coupling and can escape.

It should be noted that the proposed safety breaking device is particularly suitable for connector couplings for various connectors, especially for connector nipples for vehicle refuelling. Because of the compact construction the safety breaking device can even be used as an intermediate coupling in a hose or feed line, for example even at the "petrol pump end". In the normal case of the connected position, secure engagement of the locking elements, especially the collet jaws is ensured through the piston which can slide in the housing, while even in the exception case of breaking apart with defined release of the collet jaws, the sealed state is ensured by the automatic closing of the outlet valve. The safety breaking device can be constructed relatively simply, so that damage both to the line or coupling side and to the nipple side is reliably avoided.

It is particularly important that the release force of this coupling can be adjusted by means of a spring, especially a compression spring in conjunction with suitable dimensioning of piston annular surfaces in an annular chamber, so that reliable and rapid presetting of the break-away force to match the coupling to the current conditions is facilitated.

BRIEF DESCRIPTION OF THE DRAWINGS

An embodiment will now be explained in more detail and described with reference to the accompanying drawings, in which:

FIG. 1 is a side view of a preferred coupling for a connector nipple with a connection profile, wherein the coupling is shown in longitudinal half section and in its connected position; and FIG. 2 is a front view of the connector nipple.

DETAILED DESCRIPTION OF THE INVENTION

A preferred embodiment of a connector coupling 10 with connection direction A to a connector nipple 30 is shown in FIG. 1. The connector coupling 10 comprises a tubular housing 11, here in three parts, where the right end serves as an inlet 12 and the left end as an outlet 13 for feeding on the transported fluid to the connector nipple 30. The inlet 12 to the housing 11 has a connector adapter 14 which is sealed by a seal 14a against the housing 11 (more precisely the housing part 11a). The connector adapter 14 also has a thread 14b at its end here on the right, to which a hose 1 (or equally a pipeline) is connected to supply the fluid to be transported. The connector adapter 14 can be designed to match the fluid to be transported, especially the currently desired feed angle, through-flow cross-section, etc., being for example bent over.

At the end opposite the connector adapter 14, here the outlet 13, a plurality of elongated collet jaws arranged in tubular form are provided as locking elements 15, which are spread apart radially before fitting on to the connector nipple 30, as is shown for example also in WO-A 93/20378 previously cited. The elongated collet jaws, being the preferred form of a locking element 15, of which at least three and generally six collet jaws are provided, are hooked at their ends here on the right in an annular groove of a piston extension 22' and are so biased by a garter spring 16 that the collet jaws can be spread radially apart. At the end here on the left at the surface offset to the inside the collet jaws have interlocking engagement profiles 17 match the corresponding connector profile 31 of the connector nipple 30. On their outside inclined oblique surfaces 21 are provided, which facilitate the breaking operation after reaching a predetermined break-away force, as further described below.

In outer locking sleeve 11C is provided around the collet jaws and is screwed to middle part 11b of the cylindrical housing 11, the latter part in turn being fixed to the housing part 11a of the housing 11 to which the connector adapter 14 is fixed, as well as on which an actuating device 18 is mounted. The actuating device comprises an eccentric 19 known per se and a plunger 20, which can slide a piston 22 (together with its associated piston extension 22') in the direction of the connector nipple 30, to produce the sealed connection.

The piston 22 with its piston extension 22' is guided on the inner peripheral surface towards the outlet 13 of the middle part 11b of the housing 11 and has a stepped sealing shoulder 23 for abutment against a seal 32 of the connector nipple 30. The piston 22, here in two parts for assembly reasons but fixedly screwed to its piston extension 22', is sealed relative to the collet jaws and the actuating device 18 by sealing rings 24 fitted in the middle part 11b of the housing 11, so that the gaseous and/or liquid fluid flowing essentially along the central axis of the connector coupling 10 cannot escape to the outside.

A check valve 25 mounted centrally in the piston 22 is furthermore important and a sealing cone 26 thereof seals against an inner sealing surface 27 on the piston extension 22' in the closed position. The check valve 25 is biased by a compression spring 28, which is fixed in the piston 22 by means of centring insert 29, specifically here clamped between the two piston parts 22 and 22' which are screwed together. By means of this check valve 25 it is ensured that the fluid passed through the connector adapter 14 cannot escape in the uncoupled position or break-away position, nor till shortly before the connection of the coupling 10 to the connector nipple 30, even with the connecting tap at the filling station or the like open.

The check valve 25 is, as here shown, opened on fitting the connector coupling 10 on to the connector nipple 30, as is also a symmetrically arranged sealing cone 33, where the later is pressed in along the axis of the connector nipple 30 when connecting up and forms a check valve 34 associated with the connector nipple 30, which is constructed with a constructionally similar centring insert and a compression spring, like the check valve 25.

An annular chamber 40 arranged on the outer periphery of the piston 22 is particularly important, having a spring 41 arranged therein, denoted compression spring 41 below. The compression spring 41 is supported to the left on a shoulder 22b of the housing 11 or of the piston extension 22' and acts to the right on a piston annular surface 22a on the piston 22. As can be seen from the drawing, the annular chamber 40 communicates with the inner fluid passage through a radial bore 42, whereby the housing 11 is maintained in a compensated or balanced position relative to the piston 22. The piston annular surface 22a is pushed by the compression spring 41 up to the inwardly offset region at the plunger 20, whereby a stop for the displacement of the piston 22 is also provided, especially also with fitted stop sleeves 43 and 44, whereby a relative axial movement (against the connection direction A) of the components with equalised pressure force to the two sides, needed to release the locking, i.e. relative movement of the housing 11 on the axially locked piston 22/22'.

In the connected position of the coupling 10 the two check valves 25 and 34 are brought into contact with each other on fitting on to the connector nipple 30, whereby these move substantially simultaneously depending on the spring design in opposite directions. The sealing shoulder 23 also comes into contact with the seal 32, so that escape of fluid which may be present at the check valve 34 of the connector nipple 30 is avoided. In addition the piston 22 is pushed to the right by the abutment of the sealing shoulder 23 on the seal 32, until the collet jaws 15 are received in the locking sleeve 11c and are held together by the conical bevelled surfaces 21, i.e. are locked on to the connection profile 31.

The piston 22 is pushed to the right essentially only by the spring force of the (compression) spring 41, which thus defines the response threshold force of the safety breaking device. In the exception case of breaking apart movement, the housing parts 11a, 11b and 11c of the housing 11 are thus drawn by the pulling forces acting on the hose 1 to the right against the spring force of the compression spring 41 and thus free the collet jaws 15 from their blocking position, so that the engagement of their engagement profile 17 on the correspondingly formed connecting profile 31 of the connector nipple 30 is lost, namely through the axial movement of the locking sleeve 11c and the freeing in the radial direction along the bevelled surfaces 21.

This movement is not prevented even at very high connection pressures of 1000 bar for example, since the pressure acts to substantially the same extent on the oppositely directed annular surfaces 22a and 22b. It should be noted that the piston annular surfaces 22a and 22b are so dimensioned as to their active surfaces that the housing 11 is in a balanced "floating position" relative to the piston 22 (with the associated piston extension 22') locked axially by the collet jaws 15. Breaking apart security is thus achieved even with increasing fluid pressure and thus particularly reliable safety of the connector coupling 10 is achieved at all pressure ranges.

In order to release the connector coupling 10 thus return from the connected position shown in FIG. 1 into the open position, the locking sleeve 11c is retracted by means of the actuating device 18. After a short movement the collet jaws as the preferred locking elements 15 (balls or pins are also possible) can spread apart radially while the piston 22 is similarly pushed here to the left towards the outlet end 13 against the action of the compression spring 41. Before the sealing contact between the piston 22 and the seal 32 is lost, the check valve 25 preferably provided closes and simultaneously the check valve 34 of the connector nipple 30 also closes. Very rapid closure of the check valves is achieved through this practically simultaneous sequence, so that no volume of fluid can escape. This design also allows safe fitting of the connector coupling 10 on to the connector nipple 30, where the sealing contact between the seal 32 and the sealing shoulder 23 is ensured, since the open position of the collet jaws 15 is maintained until the connection is produced by the axial displacement of the piston 22 and the consequent entrainment of the piston extension 22'.

A return feed line 60 fixed to the housing 11 is also important. The return feed line 60 can be plugged in and out of the connector nipple 30 in the connection direction A together with the coupling 10, to which a mating part 61 with a clip on tab 62 is fixed (see FIG. 2). As can be seen from FIG. 1, the clip on tab 62 is preferably fixed in a stable position between two nipple parts, so that secure fixing of the tab 62 results for the break-apart case, while the return feed line 60 can easily be withdrawn from the mating part 61.

What is claimed is:

1. A coupling with a safety breaking device for transporting fluids via a fluid line comprising:
   a tubular housing connected to the fluid line;
   a locking element comprising a plurality of expandable collet jaws;
   a connector nipple formed to engage with said collet jaws;
   a piston having first and second oppositely directed annular surfaces, said piston being slidably mounted in and guided in at least one sleeve on the inner surface of the housing, said piston and said housing defining an annular pressure-tight, sealed chamber therebetween, whereby said housing is slidable relative to said piston against a closing direction of the coupling to release the engagement of the locking element wherein the effective surface area of the first piston annular surface corresponds to the sum of the surface areas of oppositely facing annular surfaces so as to provide pressure force equalization; and
   a compression spring mounted within said annular chamber and in contact with at least one of said piston annular surfaces, whereby said piston is biased against the closing direction by said spring to set a safety breaking force.

2. The coupling according to claim 1, further comprising a radial bore between a fluid passage of the coupling and said annular chamber.

3. The coupling according to claim 1, further comprising a stop sleeve arranged in said annular chamber to limit the axial stroke of said piston.

4. The coupling according to claim 1, further comprising opposed check valves, arranged in said piston and said connector nipple.

5. The coupling according to claim 1, further comprising a return feed line, arranged along said housing, and engaged in a mating part on said connection nipple in the connected position.

6. The coupling according to claim 1, wherein said housing comprises a locking sleeve having a beveled surface opposite an engagement profile of said locking element.

* * * * *

UNITED STATES PATENT AND TRADEMARK OFFICE
CERTIFICATE OF CORRECTION

PATENT NO. : 6,616,196 B1
DATED : September 9, 2003
INVENTOR(S) : Weh et al.

It is certified that error appears in the above-identified patent and that said Letters Patent is hereby corrected as shown below:

<u>Title page,</u>
Item [54], Title, please change from "COUPLING HAVING MEANS WHICH PREVENT SEPARATION" to -- COUPLING WITH A SAFETY BREAKING DEVICE --.

Signed and Sealed this

Twenty-ninth Day of June, 2004

JON W. DUDAS
*Acting Director of the United States Patent and Trademark Office*